United States Patent
Carrel et al.

(10) Patent No.: US 11,750,581 B1
(45) Date of Patent: Sep. 5, 2023

(54) SECURE COMMUNICATION NETWORK

(71) Applicant: GRAPHIANT, INC., Fremont, CA (US)

(72) Inventors: David Carrel, Tiburon, CA (US); Mosaddaq Turabi, San Jose, CA (US)

(73) Assignee: GRAPHIANT, INC., Fremont, CA (US)

( * ) Notice: Subject to any disclaimer, the term of this patent is extended or adjusted under 35 U.S.C. 154(b) by 110 days.

(21) Appl. No.: 17/518,983

(22) Filed: Nov. 4, 2021

Related U.S. Application Data

(63) Continuation of application No. 17/478,705, filed on Sep. 17, 2021, now abandoned.

(51) Int. Cl.
*H04L 9/40* (2022.01)

(52) U.S. Cl.
CPC ...... *H04L 63/0464* (2013.01); *H04L 63/0485* (2013.01); *H04L 63/164* (2013.01)

(58) Field of Classification Search
CPC  H04L 63/0464; H04L 63/0485; H04L 63/164
USPC .......................................................... 726/2
See application file for complete search history.

(56) References Cited

U.S. PATENT DOCUMENTS

| | | | | |
|---|---|---|---|---|
| 7,042,838 | B1* | 5/2006 | Shand | H04L 45/00 370/221 |
| 2003/0018715 | A1* | 1/2003 | O'Neill | H04L 45/16 709/204 |
| 2007/0091793 | A1* | 4/2007 | Filsfils | H04L 45/28 370/228 |
| 2008/0195733 | A1* | 8/2008 | Detienne | H04L 43/00 709/224 |
| 2010/0284305 | A1* | 11/2010 | Papp | H04L 45/04 370/254 |
| 2015/0003455 | A1* | 1/2015 | Haddad | H04L 45/38 370/392 |
| 2015/0117462 | A1* | 4/2015 | Brandt | H04L 65/70 370/392 |
| 2018/0102919 | A1* | 4/2018 | Hao | H04L 41/50 |
| 2018/0152317 | A1* | 5/2018 | Chang | G06F 3/0611 |
| 2019/0297053 | A1* | 9/2019 | Gaddehosur | H04L 61/2592 |

* cited by examiner

*Primary Examiner* — Michael S McNally
(74) *Attorney, Agent, or Firm* — Maschoff Brennan

(57) ABSTRACT

Embodiments of a secure communication network are disclosed. For secure communication of data packets, a method implemented in a core node, is presented. The method includes receiving a double encapsulated data packet associated with a first layer and a second layer of encapsulation/encryption. The method further includes decapsulating/decrypting a second layer of encapsulation/encryption to access a portion of the data packet and re-encapsulating/re-encrypting at least the accessed portion with another second layer of encapsulation/encryption. The method further includes transmitting the re-encapsulated/re-encrypted data packet to a subsequent node based on the accessed portion.

20 Claims, 4 Drawing Sheets

SECURE COMMUNICATION NETWORK

CROSS REFERENCE TO RELATED APPLICATIONS

This application is a continuation of U.S. Non-Provisional patent application Ser. No. 17/478,705, titled "SECURE COMMUNICATION NETWORK", filed on Sep. 17, 2021, which is assigned to the assignee hereof and hereby, expressly incorporated by reference herein.

FIELD OF THE INVENTION

The embodiments discussed in the present disclosure are generally related to providing secure communication in networks. In particular, the embodiments discussed are related to provide secure communication in networks based on Internet Protocol Security (IPsec) communication protocol.

BACKGROUND OF THE INVENTION

Existing communication networks provide secure communication between source and destination nodes in a network by setting up virtual private networks (VPNs) using IPsec protocol. To ensure integrity of data communicated between these nodes during communication, a single end-to-end tunnel is created between the source and destination nodes. The destination node performs an end-to-end integrity check in this solution. However, if there are several hops along the network between the source and destination nodes, it may be computationally complex to ascertain the precise source of data manipulation with just the end-to-end integrity check. Additionally, key management for such hops may further contribute to the computational complexity of the solution.

Another brute-force approach includes creating a double tunnel between the source and destination nodes. This includes creating a second tunnel between each pair of intermediate nodes (between the source and destination nodes), in addition to the end-to-end (first) tunnel. While the end-to-end tunnel ensures an end-to-end integrity, each intermediate node additionally performs cryptography, integrity check, and anti-replay checks for a data packet which may be computationally expensive. In addition, in this approach, the data packet is decrypted and re-encrypted in its entirety, at each intermediate node. During this process of decryption and re-encryption, each intermediate node can access contents of the data packet, which makes the data vulnerable to manipulation by $3^{rd}$-party attackers.

Therefore, there is a need for providing a more secure and less computationally expensive mechanism for secure communication in a network.

SUMMARY OF THE INVENTION

Embodiments of a secure communication network and a corresponding method are disclosed that address at least some of the above challenges and issues.

In accordance with the embodiments of this disclosure, a method implemented in a core node, is presented. The method includes receiving a double encapsulated data packet associated with a first layer and a second layer of encapsulation/encryption. The method further includes decapsulating/decrypting a second layer of encapsulation/encryption to access a portion of the data packet and re-encapsulating/re-encrypting at least the accessed portion with another second layer of encapsulation/encryption. The method further includes transmitting the re-encapsulated/re-encrypted data packet to a subsequent node based on the accessed portion.

BRIEF DESCRIPTION OF THE DRAWINGS

Further advantages of the invention will become apparent by reference to the detailed description of preferred embodiments when considered in conjunction with the drawings.

DETAILED DESCRIPTION

Figure 1:
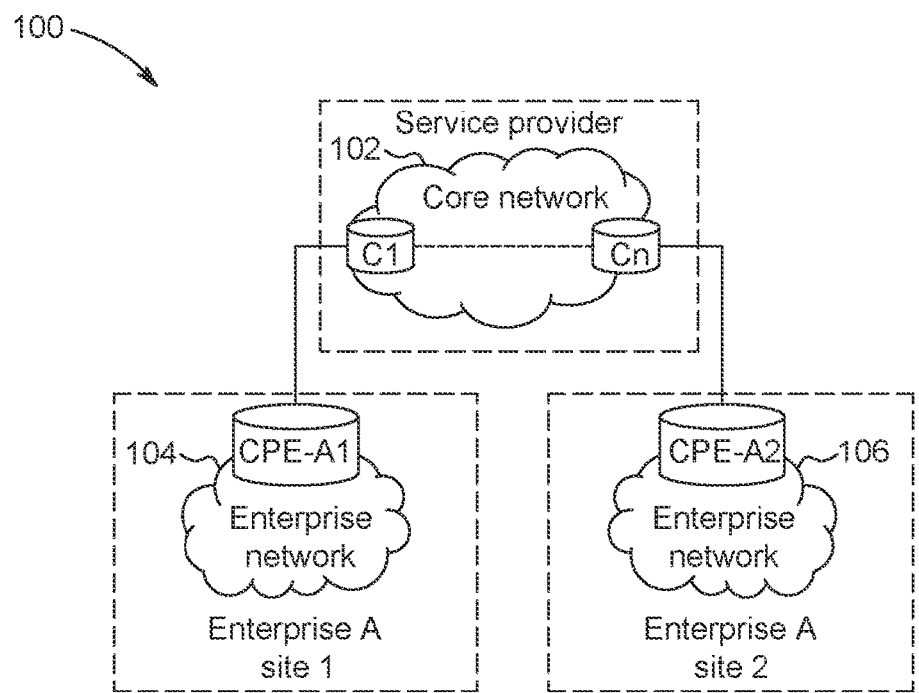
FIG. 1 illustrates a network architecture for implementing disclosed embodiments of a secure communication network, according to an embodiment.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Certain terms and phrases have been used throughout the disclosure and will have the following meanings in the context of the ongoing disclosure.

A "network" may refer to a series of nodes or network elements that are interconnected via communication paths. The network may include any number of software and/or hardware elements coupled to each other to establish the communication paths and route data via the established communication paths.

An "enterprise network" may refer to a network owned, leased, and/or managed by customers, which may include one or more business entities. By way of an example, the enterprise network may refer to internal network infrastructure employed by an enterprise or organization to provide connectivity among users, devices, and applications that are local to the enterprise. Various such enterprise networks located at different sites may need to be connected to each other via a core network for external communication. Therefore, an enterprise network may include one or more internal networks that are located at geographically separate sites.

The "core network" may refer to a network infrastructure that may provide services to connect one or more enterprise networks with each other. The core network represents a central or core element that provides one or more routing paths for exchange of information between different enterprise networks. The core network may facilitate high-capacity communication between different enterprise networks located at different geographical locations.

A "core node" may refer to any node within the core network, which is capable of routing data packets to another core node within the core network. The core node may include, but not limited to an access point, a router, a bridge, a server, a gateway, a switch, a modem, a relay, or a hub.

In the core network, the "ingress core node", handle incoming data from another network such as an enterprise network. In the core network, the "egress core node", handles outgoing data to another network. An "intermediate core node" refers to a node between the ingress core node and the egress core node in the core network. In the examples provided in this disclosure, "Cx" generally refers to core nodes (e.g., C1, C2, C3 and so on), "C1" refers to the ingress core node, C2 refers to the intermediate node, and C3 refers to the egress core node.

A "routing path" may refer to a traversal path for a given data packet in the core network. The routing path may include a number of hops from one core node to another core node, within the core network. Herein, each core node may be connected to another core node within the core network, via a "hop". Similarly, a core node may be connected to a subsequent node in an enterprise network (such as a CPE) via another hop.

A "service provider" (SP) may refer to an entity providing, managing, and/or operating a core network, over which data is routed to and/or from one or more enterprise customers. The disclosed architecture provides a method for the SPs to provide connectivity services to the one or more enterprise customers over the core network, which is a shared core infrastructure. Non-limiting examples of SPs may include Secure Access Service Edge (SASE) providers, Network as a Service (NaaS) providers, Multiprotocol Label Switching (MPLS) Virtual Private Network (VPN) providers, and Software Defined Wide Area Network (SD-WAN) providers.

In general, the core networks and enterprise networks may include any known network infrastructure in the context of telecommunication networks. In the spirit of the ongoing disclosure, such network infrastructure may include access points, routers, bridges, servers, gateways, switches, modems, relays, and hubs. The enterprise networks additionally include customer premises equipments (CPEs), which are located within the premises of the enterprise networks. The CPEs may include, but not limited to, gateways, switches, routers, network adapters, and so on.

An "ingress CPE" may receive data packet(s) originated from an endpoint device and perform encryption and/or encapsulation on the received data packets to create encrypted and/or encapsulated data packet(s). The ingress CPE may transmit the encrypted and/or encapsulated data packet(s) towards an "egress CPE" via the core network. The egress CPE may receive the encrypted and/or encapsulated data packet(s) from the core network and transmit these data packet(s) to an intended destination node. In this disclosure, "CPE-Ax" refers to CPEs of a customer enterprise A. For example, CPE-A1, CPE-A2, and CPE-A3 refer to CPEs for a customer enterprise A. Similarly, for a different customer B, the CPEs may be denoted by "CPE-Bx" and so on.

An "endpoint device" may be any device associated with customers, individuals, or end users. The endpoint device may be a source node and/or a destination node to transmit and/or receive data packets from customer premises equipments (CPEs) via the core network. In an embodiment, the source node may create and transmit the data packets to the destination node, via the ingress CPE, core network, and the egress CPE. The endpoint device may include, but is not limited to, a computer, a personal digital assistant (PDA), a laptop, a cellular telephone, a tablet, or any other device or network element capable of initiating or exchanging data within one or more communication networks.

Furthermore, a "data packet" refers to data or information that is packaged for transmission over a network. The data packet created by the ingress CPE may include a payload portion, a metadata portion, and one or more headers. The headers may include one or more of, but not limited to, an inner internet protocol (IP) header and an outer IP header. The payload portion may include data (e.g., customer related data) that the source node of an enterprise network may intend to transmit to the destination node of the enterprise network. Such data included in the payload portion may be sensitive and/or confidential and may need to be protected from any attack or impersonation by external or suspicious parties. Further, the term "data" refers to any type of information, such as but not limited to messages, voice, video, media, or any other information in any appropriate format that may be communicated from one point to another.

For secure communication of data packets through a network, various "encapsulation" techniques defined by the IPsec standard, may be implemented to encapsulate the data packets. For instance, the deployed encapsulation techniques may include, but not limited to, an ESP encapsulation as defined by the IPsec standard, a customized ESP encapsulation, and a generic routing encapsulation (GRE). One or more of these techniques may be implemented, either individually or in combination with each other, without departing from the scope of the ongoing description.

In order to further enhance the security of the data packet, one or more "encryption" techniques may also be implemented. For instance, encryption techniques such as, but not limited to, an ESP encryption as defined by the IPsec standard, a customized ESP encryption, an Advanced Encryption Standard (AES) encryption, a Data Encryption Standard (DES) encryption, and Triple-DES encryption may be implemented to encrypt the data packet.

In an embodiment, the ingress CPE implements a "double encapsulation" technique to encapsulate the data packet received from the source node. The ingress CPE may, therefore, transmit a double encapsulated data packet to the egress CPE, via the core network. Here, the double encapsulation may include encapsulating the data packet with a first layer of encapsulation to create a single encapsulated data packet. The double encapsulation may further include encapsulating this single encapsulated data packet with a second layer of encapsulation to create a double encapsulated data packet. In one example, when the ingress CPE transmits the double encapsulated data packet to the ingress core node, the second layer of encapsulation may encapsulate one or more labels, a source address (e.g. IP address of the ingress CPE) and a destination address (e.g. IP address of an egress core node). Similarly, when the data packet is subsequently transmitted from one node to another (e.g. between core nodes and/or from the egress core node to the egress CPE), the second encapsulation may encapsulate the corresponding labels, source address, and the destination address.

In another embodiment, one or more layers of encryption may also be implemented along with the double encapsulation to further enhance the security of the received data packet. For instance, once the ingress CPE encapsulates the data packet using the first layer of encapsulation, the ingress CPE may encrypt the encapsulated data packet using a first layer of encryption. First layer of encryption is done based on security association between the ingress and egress CPE. This will ensure that the first layer of encryption can only be de-crypted by egress CPE. Subsequently, the ingress CPE may implement the second layer of encapsulation over and above this first layer of encryption, to create the double encapsulated data packet. In an embodiment, the ingress CPE may further encrypt the double encapsulated data packet using a second layer of encryption, to create a double encrypted data packet, for additional security. The second layer of encryption is done based on the security association between the ingress CPE and the ingress core node. The ingress CPE may then, transmit the double encrypted data packet to the egress CPE, via the core network. The core node would be able to decrypt the second layer of encryption.

The embodiments of this disclosure will now be described with reference to a "double encapsulated" data packet. However, a person skilled in the art would understand that for explanation purposes, these embodiments may also include double encryption along with double encapsulation even if the data packet is not explicitly referred to "double encrypted." Additionally, any combination of encapsulation and/or encryption techniques may be included within the scope of this disclosure.

In the embodiments of this disclosure, when the core nodes receive the double encapsulated data packet, the core nodes decapsulate and/or decrypt the respective second layers of encapsulation and/or encryption but not the respective first layers. The egress CPE, however, decapsulates and/or decrypts the respective second layers and first layers of encapsulation and/or encryption.

In accordance with the embodiments of this disclosure, a core node is presented. The core node may include a processor and a memory storing computer-executable instructions that when executed, cause the processor to receive a double encapsulated data packet associated with a first layer and a second layer of encapsulation. The computer-executable instructions further cause the processor to decapsulate a second layer of encapsulation to access a portion of the data packet and re-encapsulate at least the accessed portion with another second layer of encapsulation. The computer-executable instructions further cause the processor to transmit the re-encapsulated data packet to a subsequent node based on the accessed portion.

The second layer of encapsulation/encryption is based on a security association between the core node and another node, from which the core node receives the double encapsulated data packet. Further, second layer of encapsulation/encryption is based on a security association between the core node and the subsequent node when transmitting.

In the above-described embodiments, the received data packet is associated with a first layer of encryption and a second layer of encryption. Further, the computer-executable instructions further cause the processor to decrypt the second layer of encryption and re-encrypt the data packet with the second layer of encryption before transmission.

In an embodiment, the first layer of encapsulation encapsulates a payload portion of the received data packet. The second layer of encapsulation encapsulates the encapsulated payload portion, a metadata portion, and one or more headers of the received data packet.

In an embodiment, the computer-executable instructions further cause the processor to perform one or more of an integrity check and an anti-replay check on the accessed portion of the data packet to verify one or more contents of the accessed portion. Subsequently, the computer-executable instructions further cause the processor to re-encapsulate at least the accessed portion based on a positive verification of one or more of the integrity check and the anti-replay check. The computer-executable instructions further cause the processor to discard the data packet based on a negative verification of the integrity check and/or the anti-replay check.

Further, the computer-executable instructions further cause the processor to transmit the re-encrypted/re-encapsulated data packet to the subsequent node via a secure IPsec tunnel.

These and other embodiments of the methods and systems are described in more detail with reference to FIGS. 1-5.

FIG. 1 illustrates a network architecture 100, in accordance an embodiment. In this embodiment, the network architecture 100 may include a core network 102 operated by a service provider and an enterprise network 104 operated by customer A and located at site 1. The network architecture 100 may also include an enterprise network 106 operated by the same customer A and located at site 2 that may be geographically separated from site 1. Further, the core network 102 may represent a network owned and/or operated by the service provider to provide connectivity services to one or more customers, such as customer A depicted in FIG. 1. For example, the enterprise network 104 may communicate with the enterprise network 106 in a secure manner via the core network 102.

A person skilled in the art would understand that it is not necessary that the enterprise network 104 and enterprise network 106 are operated by the same customer and they may be owned/managed by different customers as well. For example, both these enterprise networks may either be different internal networks (e.g., intranets) of the same organization, at different geographical locations or they may be networks owned, managed, and operated by separate organizations, at different locations. Additionally, there can be any number of enterprise networks in the network architecture 100 and one or more of these enterprise networks may be operated by one customer while the remaining may be owned by other customer(s). Further, such enterprise networks may be located geographically in different locations, which may either be in proximity to each other or remotely located with respect to each other.

Referring to FIG. 1, the core network 102 may represent backend infrastructure that may provide routing paths for exchange of information between different enterprise networks such as enterprise networks 104 and 106. The core network 102, in some embodiments, may be referred to as the service provider network (or network core or service provider core or backbone network) without departing from the scope of the ongoing description. The core network 102 may include one or more core nodes C1 to Cn, as shown in FIG. 1, as described earlier in this disclosure.

In one example, the ingress CPE (e.g., CPE-A1) and the egress CPE (e.g., CPE-A2) may be a part of the enterprise network 104 and the enterprise network 106, respectively. Further, the core network 102 may communicate with the enterprise networks (e.g., 104, 106) through at least one enterprise node (e.g., CPE-A1, CPE-A2). Thus, the core network 102 may facilitate exchange of information between enterprise networks 104 and 106.

It would be apparent to a person skilled in the art that an enterprise (such as enterprise A) may include more than one enterprise networks at multiple locations. FIG. 1 merely exhibits a non-limiting example of two remote sites of enterprise A. Other configurations and scenarios are also possible where information can be exchanged between multiple sites of enterprise A. Information may be exchanged between one or more sites of the enterprise A and one or more sites of other enterprise(s) B, C, D and so on, and irrespective of whether all such sites are remote or proximate with respect to each other.

Figure 2:
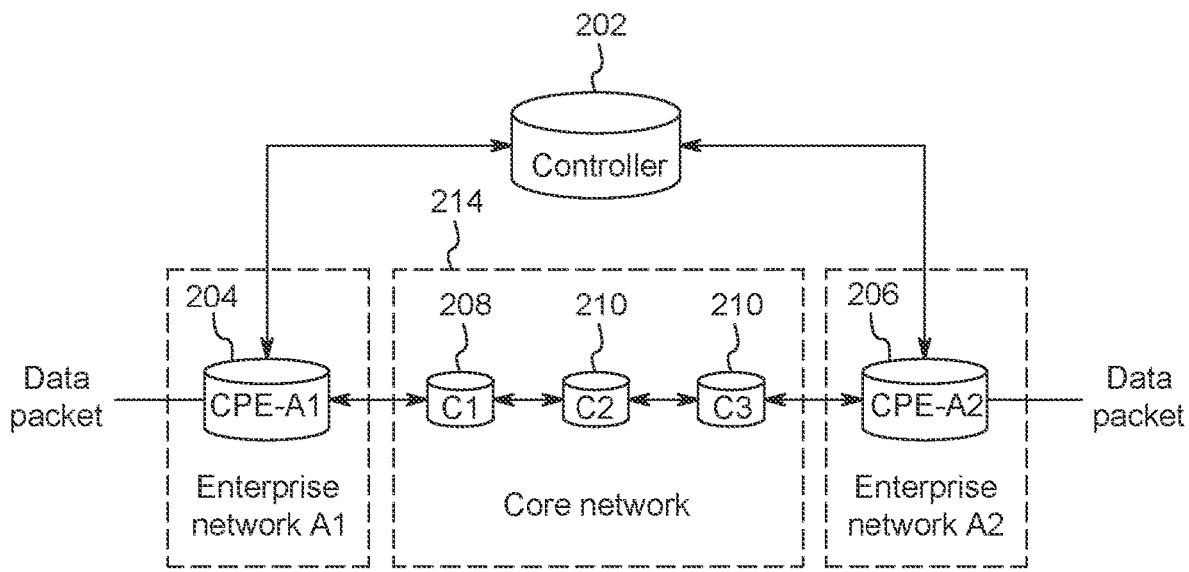
FIG. 2 illustrates a more detailed network architecture for implementing disclosed embodiments of a secure communication network, according to an embodiment.

FIG. 2 illustrates a more detailed example network architecture 200 in accordance with an embodiment. FIG. 2 will be explained in conjunction with description of FIG. 1. Specifically, components having the same name are to be understood as similar in functionality and characteristics. As depicted in FIG. 2, the core network 214 may include one or more core nodes such as C1 208, C2 210, and C3 212, which may be equivalent to the core nodes C1 to Cn of FIG. 1. Here, C1 208 may correspond to an ingress core node while C3 212 may correspond to an egress core node of the core network 214. The network architecture 200 may also include a controller 202, one or more enterprise nodes or CPEs such as CPE-A1 204 and CPE-A2 206, which may be equivalent to CPE-A1 and CPE-A2, as described in the context of FIG. 1. In an embodiment, the controller 202 may be a dedicated controller for a customer, such as enterprise A, to facilitate communication between the CPEs of enterprise networks A1 and A2 via a core network 214. In another embodiment, the controller 202 may be a multi-tenant controller configured for multiple tenants such as enterprise A, enterprise B, enterprise C and so on. A multi-tenant controller may include logical segmentation for different customers and thus, segmentation may be maintained across different customers.

Additionally, the controller 202 may correspond to a server computing device associated with the customer A. The controller 202 may, for instance, be a centralized managing node that may be owned, leased, and/or operated by the customer A to manage communication between the enterprise nodes owned and operated by the customer A. The controller 202 may, for instance, facilitate control plane functions associated with the enterprise networks A1 and A2, as described later in this disclosure. Based on the control plane functions, the controller 202 may also facilitate establishment of a data plane that connects the enterprise networks A1 and A2 for communication of data packets between these enterprise networks. Additionally, the controller 202 may also facilitate configuration of the respective CPEs (ingress CPE and egress CPE) of these enterprise networks, for communication over the data plane, as described later in this disclosure. In an embodiment, the controller 202 may be an "off path" controller, which is a dedicated controller specifically configured to perform the above-described functions. In an alternate embodiment, the controller 202 may be an "in-band" controller. An in-band controller may be implemented in one or more core nodes, configured to perform the above-described control plane functions in addition to being configured to perform the data plane functions of the core node, as described later in this disclosure.

In an embodiment, the controller 202 may facilitate exchange of control information over a control plane between CPE-A1 204 and CPE-A2 206. The control information may include, but not limited to, routing information (e.g., MPLS labels), encryption keys/security association information, and core network association information. The controller 202 may then facilitate setting up secure communication channels between various enterprise nodes such as CPE-A1 204 and CPE-A2 206 in the form of end-to-end IPsec tunnels. These tunnels may be set up to enable direct and secure communication between the enterprise nodes over the data plane.

In one example, the controller 202 may facilitate direct communication between the CPEs by performing any of the known authentication, authorization, and accounting (AAA) procedures. Additionally, in accordance with the embodiments of this disclosure, the controller 202 may, on successfully authenticating the CPEs, establish a connection to each CPE (e.g., CPE-A1 204 and CPE-A2 206). The controller 202 may then, receive encryption keys from CPE-A2 206, and transmit them to CPE-A1 204, in accordance with an embodiment. In an embodiment, the above (control plane) procedures may be performed before CPE-A1 204 transmits a data packet to CPE-A2 206, via the data plane. The key sharing by the controller 202 may enable CPE-A2 206 to subsequently decrypt (and decapsulate) the data packet transmitted by CPE-A1 204, via the core network 214.

In one example, the controller 202 may implement a Controller-based Internet Key exchange (IKE) mechanism to exchange encryption keys between CPE-A1 204 and CPE-A2 206. Here, CPE-A1 204 and CPE-A1 206 may create Diffie—Hellman public key/value for end-to-end encryption. CPE-A1 204 may then, share the Diffie—Hellman public key with the controller 202, which may further share this public key with CPE-A2 206 (and vice versa for CPE-A2 206). CPE-A1 204 and CPE-A2 206 may then, compute the end-to-end encryption key based on the received Diffie—Hellman public key/value, as known in the Internet Engineering Task Force (IETF) standard.

Further, the controller 202 may communicate (to CPE-A1 204) a label (e.g., an MPLS global label) associated with the egress core node that may be connected to CPE-A2 206. Additionally, the controller 202 may communicate another label (e.g., an MPLS link label) associated with a link (or hop) between the egress core node and CPE-A2 206. CPE-A1 204 may include these labels in the data packet transmitted to the ingress core node of the core network 214 during data plane communication. Here, the labels may be provided to the controller 202 by CPE-A1 204 and CPE-A2 206, in the control information exchanged over the control plane. In one example, these labels may be included by the CPE-A1 204, in the outer header of the data packet. In another alternative example, the labels may be included in the metadata portion of the data packet. The label associated with the egress core node facilitates determination of a routing path of the data packet in the core network 214, as will be described in more detail with reference to FIG. 3. The label associated with the link between the egress core node and CPE-A2 206 enables the egress core node to transmit the received data packets to CPE-A2 206, as will also be described with reference to FIG. 3, later in this disclosure.

In an embodiment, the controller 202 may at least include a processor, a memory storage and one or more hardware and/or software modules, as may be required for implementing the above-described functions of the controller 202. In one example, the controller 202 may be a software-defined wide area networks (SDWAN) controller, which may include but not limited, Cisco SDWAN controller.

Figure 3:
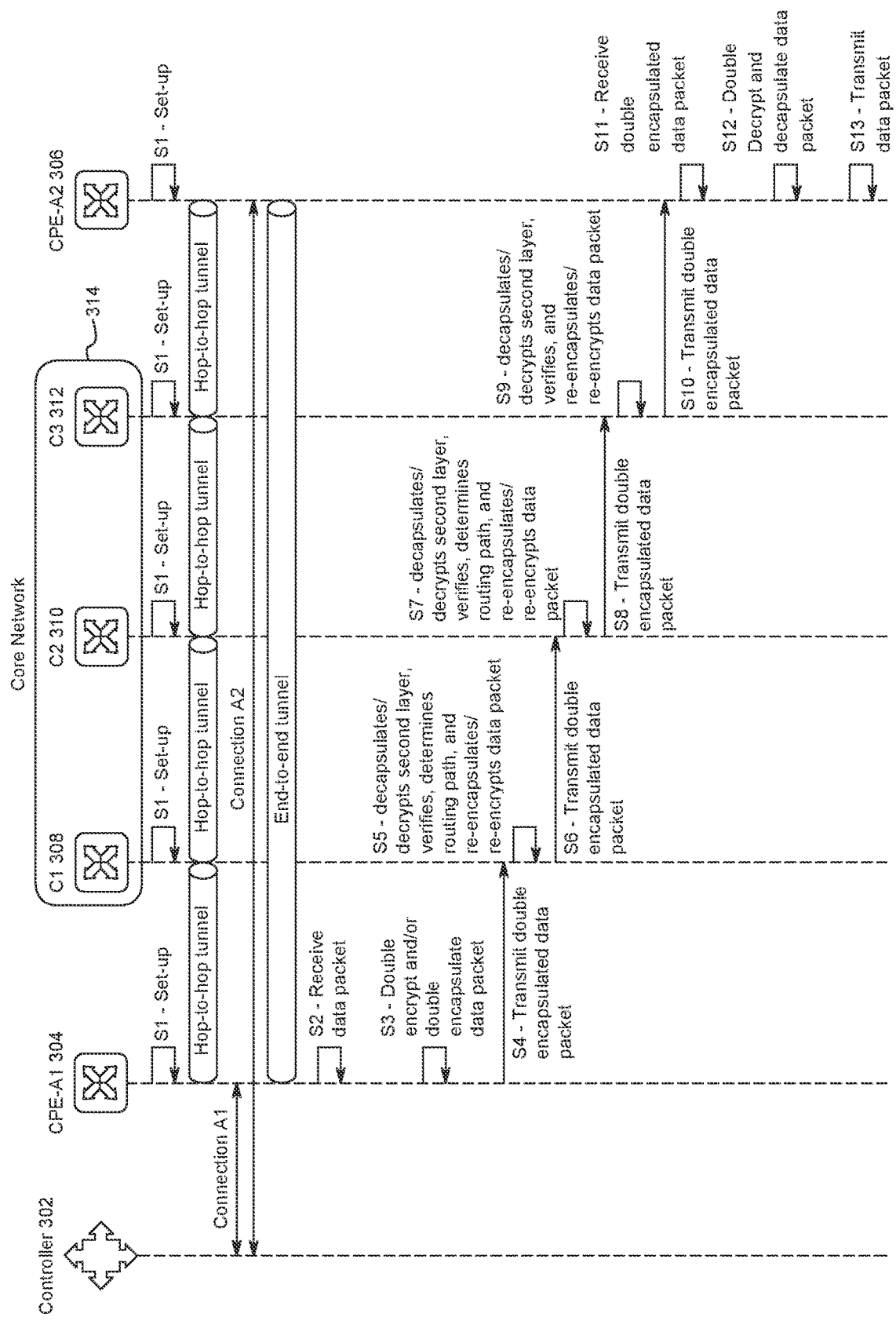
FIG. 3 is a signal flow diagram to illustrate flow of a data packet between enterprise nodes of enterprise networks, according to an embodiment.

FIG. 3 is a signal flow diagram to illustrate the flow of a data packet between enterprise nodes of the enterprise networks, in accordance with an embodiment. Herein, CPE-A1 304 may be equivalent to CPE-A1 204 in its functionality, as described above.

Step S1 of the illustrated method in FIG. 3, may include a "set-up phase." In the set-up phase, all nodes in the enterprise network and the core network may be configured to establish connections with other nodes to implement the steps of the illustrated method, as described herein. In an embodiment, each core node in the core network 314 may be configured to establish hop-by-hop tunnel to its adjacent core nodes to form a mesh network. For example, CPE-A1 304 may be configured to establish a hop-by-hop tunnel with an ingress core node e.g., C1 308. Similarly, CPE-A2 306 may be configured to establish a hop-by-hop tunnel with an egress core node e.g., C3 312.

Further in this step, CPE-A1 304 may establish a connection A1 with a controller 302 and transmit its control information over the connection A1 with a controller 302. The controller 302 may be similar in functioning to controller 202 in FIG. 2. Additionally, CPE-A2 306 may establish another connection A2 with the controller 302 and transmit its control information over the connection A2 with a controller 302. The controller 302 may then transmit the control information associated with CPE-A1 304 to CPE-A2 306 over the connection A2 and the control information associated with CPE-A2 306 to CPE-A1 304 over the connection A1. Once CPE-A1 304 receives the control information associated with CPE-A2 306, CPE-A1 304 may establish an end-to-end tunnel with CPE-A2 306.

In step S2, CPE-A1 304 may receive a data packet from a source node in the enterprise network A1. The source node may be a node that creates the data packet. A person skilled in the art would understand that in an alternate embodiment, CPE-A1 304 may be the source node and may thus, create the data packet instead of receiving the data packet from subsequent node in the enterprise network A1.

In step S3, CPE-A1 304 may double encapsulate the received (or created) data packet by using encapsulation techniques defined by the IPsec standard, as described earlier. In some embodiments, the double encapsulation may be implemented along with a double encryption of the data packet. For instance, CPE-A1 304 may, on encapsulating the received data packet with the first layer, encrypt the data packet by using encryption key associated with CPE-A2 306. Once the data packet is encrypted, CPE-A1 304 may then encapsulate the single encapsulated data packet, using the second layer of encapsulation to create a double encapsulated data packet. In some embodiments, CPE-A1304 may encrypt the double encapsulated data packet, using a second layer of encryption, as described later in this disclosure.

In an embodiment, CPE-A1304 may encapsulate the received data packet using the first layer of encapsulation to create a single encapsulated data packet. The first layer of encapsulation may be an end-to-end encapsulation. This implies that the single encapsulated data packet may be decapsulated by CPE-A2 306 but cannot be decapsulated by any of the core nodes of the core network 314. In an embodiment, the first layer of encapsulation of the data packet may encapsulate the payload portion of the data packet, which includes the customer data. Further, the first layer of encapsulation appends an end-to-end first layer header and an end-to-end first layer integrity check value (ICV) to the payload portion of the data packet. The functions of the first layer header and the first layer ICV are known in the art and are not described here in detail for brevity. In one example, the first layer of header may include known fields such as, but not limited to a Security Parameter Index (SPI), a sequence number, and an initialization vector (IV). The first layer of encapsulation may also include a first layer trailer in the data packet, which may include known fields such as Pad length, Next header and padding fields.

Therefore, the first layer of encapsulation encapsulates the payload portion, the first layer header, and the first layer ICV. The single encapsulated data packet, however, may also include unencapsulated portions of the data packet, such as, but not limited to, a metadata portion and an outer header.

In an embodiment, CPE-A1 304 may further encrypt the single encapsulated data packet with a first layer of encryption associated with CPE-A2 306 to enhance the security of the single encapsulated data packet. In one example, the first layer of encryption encrypts the payload portion. The first layer of encryption may be an end-to-end encryption, and the encrypted packet may be decrypted later by CPE-A2 306 but may not be decrypted by any of the core nodes of the core network 314.

Further, CPE-A1 304 may then encapsulate the single encapsulated data packet with the second layer of encapsulation to create the double encapsulated data packet. A person skilled in the art would understand that the single encapsulated data packet may include first layer of encapsulation and/or the first layer of encryption. The second layer of encapsulation may include a hop-to-hop encapsulation, which may be decapsulated by each core node along the routing path of the data packet to CPE-A2 306. The second layer of encapsulation may encapsulate the entire data packet. In one example, the second layer of encapsulation may at least encapsulate the portions which were not encapsulated by the first layer of encapsulation such as the metadata portion and the outer header. The second layer of encapsulation may additionally encapsulate the portions of the data packet, which were already encapsulated by the first layer of encapsulation i.e., the payload portion, the first layer header and the first layer ICV. Further, the second layer of encapsulation appends a second layer header and a second layer ICV to the single encapsulated data packet to create the double encapsulated data packet.

In an embodiment, CPE-A1 304 may additionally implement a second layer of encryption on the double encapsulated data packet to further enhance the security of the data packet. In an example, the second layer of encryption associated with next hop node may include may encrypt the second layer-encapsulated metadata portion and the first layer encapsulation headers.

Although the subsequent explanation of various embodiments refers to a "double encapsulated" data packet, a person skilled in the art would understand that the double encapsulated data packet may include the first and/or second layers of encryption along with the first and second layer of encapsulation.

In step S4, CPE-A1 304 may transmit the double encapsulated data packet to C1 308. In an embodiment, the double encapsulated data packet is transmitted via the hop-to-hop tunnel and the end-to-end tunnel, to C1 308. Here, the end-to-end tunnel may be encapsulated within the hop-to-hop tunnel. In one example, the double encapsulated data packet may be transmitted such that the inner header may be protected by the end-to-end tunnel and the outer header may be protected by the hop-to-hop tunnel between CPE-A1 304 and C1 308. In one example, the inner header may be an IPv6 header, and the outer header may be an IPv4 header. In another example, the inner header may be an IPv4 header, and the outer header may be an IPv6 header. In yet another example, both inner and outer headers may be IPv4 headers. In yet another example, both inner and outer headers may be IPv6 headers.

In an embodiment, the end-to-end tunnel may facilitate an end-to-end integrity check of the data packet by CPE-A2 306, later. Further, each hop-to-hop tunnel may facilitate more granular integrity checks by each node along the routing path of the data packet. Therefore, the embodiments presented herein, present a unique approach to create a double encapsulated data packet. This approach maximizes the overall security and performance while minimizing complexity and processing costs, as described in this disclosure.

In an embodiment, CPE-A1 304 may include the label associated with the egress core node (i.e., C3 312) and another label associated with the link between C3 312 and CPE-306, in the outer header of the data packet before encapsulation of the data packet. In this embodiment, CPE-A1 304 may have previously received the label of C3 312 from the controller 302 via the connection A1 during the control plane communication session. Further, the controller 302 may have previously received this label, over the connection A2, from CPE-A2 306.

In step S5, C1 308 may receive the double encapsulated data packet. Once C1 308 receives the double encapsulated data packet, it may decapsulate/decrypt the second layer of encapsulation/encryption of the data packet, verify the authenticity of the data packet, determine a routing path, and re-encapsulate/re-encrypt the data packet. For example, C1 308 may decapsulate the second layer of encapsulation of the data packet without accessing the payload portion of the data packet, which remains encapsulated by the first layer of encapsulation. In accordance with the embodiments presented herein, C1 308 cannot decapsulate the first layer of encapsulation. In accordance with these embodiments, none of the core nodes are capable of decapsulating the first layer of encapsulation to access the contents of the payload portion of the data packet.

As described earlier, the second layer of encapsulation concealed a portion of the data packet, which was not previously concealed by the first layer of encapsulation. On decapsulating the second layer of encapsulation, each core node may only access this portion of the data packet. In one example, this accessed portion may include the outer header and the metadata portion of the data packet.

In the embodiments where the second layer of encryption is also present in the double encapsulated data packet, C1 308 (or other core nodes) may decrypt the second layer of encryption prior to decapsulating the second layer of encapsulation. The decryption may be implemented using any conventional technique for decryption as applicable. Although C1 308 decrypts the second layer of encryption, C1 308 (or other core nodes) cannot decrypt the first layer of encryption, in the embodiments presented herein. Therefore, the core nodes can only decrypt and decapsulate the respective second layers of encryption and encapsulation but not the first layers of encryption and encapsulation.

Further, the accessed outer header may include the label associated with the egress core node (e.g., C3 312) and the label associated with the link between C3 312 and CPE-A2 306. This may enable the node C1 308 to select a suitable routing path without accessing any sensitive contents of the data packet that may be included in the payload portion concealed by the first layer of encapsulation/encryption. A similar routing path determination may be performed at each core node along the routing path of the data packet till the data packet reaches the egress core node (e.g., C3 312).

In one example, one or more core nodes may be interconnected such that several routing paths from the ingress core node to the egress core node may be feasible for the data packet through the core network 314. Here, when C1 308 accesses the outer header, it may determine the label of the egress core node from the outer header. Based on this label, C1 308 may select a specific routing path from all such feasible routing paths based on various parameters. Such parameters may include, but not limited to, network conditions, detection of broken hops, expected latency on a routing path, an expected time to live (TTL) for the data packet, number of hops on a routing path, detection of a compromised node and/or any other parameter for selecting routing paths. In an exemplary scenario, a preferred routing path such as the path through the core nodes C1 308, C2 310, and C3 312 may be the one which provides the minimum expected latency, avoids broken hops and compromised nodes along the routing path. Additional or fewer of the above-mentioned parameters may be taken into consideration while selecting a routing path in various embodiments. In the illustrated example, C2 310 may, thus, determine that the subsequent node for routing the data packet is C3 312 based on the above-described approach.

Further, C1 308 may perform an integrity check of the accessed portion to verify the authenticity of the data packet. In one example, C1 308 may perform the integrity check of the outer header and the metadata portion. If C1 308 determines that the integrity of the accessed portion has been compromised (negative verification), C1 308 may take a corrective action. In one example, the corrective action may include one or more of discarding the data packet, generating an alert for the service provider and/or an operations system associated with the service provider, creating new security associations between the compromised core node and other core nodes, and switching off operations of the comprised core node to prevent routing of subsequent data packets through the compromised core node.

If C1 308 performs a successful integrity check, C1 308 may re-encapsulate the data packet by adding another second layer of encapsulation. For example, C1 308 may add the second layer of encapsulation (re-encapsulation) to the data packet, over and above the existing first layer of encapsulation. This second layer of encapsulation may be added by C1 308 based on a first security association between C1 308 and C2 310. In one example, the security association may be specified at each node by one or more dedicated security attributes. These attributes may include, but not limited to, a unique SPI number to uniquely identify a security association, an IP destination address of the next destined node of the data packet, and an IPsec protocol to encapsulate the data packet. In an embodiment, the combination of these security attributes makes security association at each node unique with respect to the other nodes. In another example, C1 308 may also perform an anti-replay check on the accessed portion in addition to the integrity check. The anti-replay check may be performed using any conventional technique (e.g., an anti-replay window function) for implementing an anti-replay check as known in the art.

The above-described operation (for C1 308) may be repeated by each core node in the core network 314 for an enhanced hop-by-hop security in addition to the end-to-end security, which is provided by the first layer of encapsulation added by CPE-A1 304. The data packet is again associated with the first layer and yet another second layer of encapsulation during the next hop. This second layer of encapsulation may be unique to each core node that adds its respective second layer of encapsulation. The double encapsulated data packet has better security than a non-encapsulated data packet or packet encapsulated with a single layer of encapsulation (single encapsulated data packet). For example, the second layer of encapsulation conceals the outer header and the metadata portion of the data packet, which were not earlier concealed/encapsuled by the first layer of encapsulation.

In one example, the second layer of encapsulation may be added over and above the first layer of encapsulation. Herein, the first layer provides an end-to-end security by enabling CPE-A2 306 to decapsulate the first layer of encapsulation and to perform an end-to-end integrity check of the entire data packet. The second layer of encapsulation, on the other hand, provides a hop-level security by enabling the core nodes of the core network 314 to remove/decapsulate only the second layer of encapsulation to perform the integrity check and/or the anti-replay check of the accessed portion of the data packet. This increases the overall security for the data packet against $3^{rd}$-party manipulation and/or impersonation.

Further, in step S6, C1 308 may transmit the double encapsulated data packet to C2 310, during the next hop of the data packet. Here, C1 308 may also encrypt the double encapsulated data packet with the second layer of encryption prior to transmitting the double encapsulated data packet, in an embodiment.

Although the data packet transmitted from each core node is referred to as 'double encapsulated' (or re-encapsulated), the embodiments presented herein may or may not include the second layer of encryption in addition to the second layer of encapsulation. In the embodiments where the double encapsulated data packet includes the second layer of encryption, each core node would decrypt the second layer of encryption when it receives the double encapsulated data packet. The core node would later re-encrypt the re-encapsulated data packet with the second layer of encryption, prior to transmitting the re-encapsulated data packet.

Once C2 310 receives the double encapsulated data packet, in step S7, C2 310 may repeat a similar procedure as performed by C1 308. For example, C2 310 may decapsulate the second layer of encapsulation to access the portion including the outer header and the metadata portion, without accessing the payload portion. Further, C2 310 may verify the authenticity of the data packet by performing an integrity check and/or an anti-replay check on the accessed portion. In one example, C2 310 may remove the second layer of encapsulation added earlier by C1 308 and perform an integrity check of the accessed portion to verify the authenticity, in a similar manner as described in the context of C1 308.

If C2 310 performs a successful integrity check, step S7 may further include the step of determining a routing path towards the egress core node (C3 312) in a manner, as described above. Once the routing path is determined, the step S7 may further include re-encapsulating (by C2 310) the data packet by adding another second layer of encapsulation. The added second layer of encapsulation may be determined based on a second security association between C2 310 and C3 312, which is different from the security association at C1 308 (i.e., between C1 308 and C2 310). This second layer of encapsulation may re-encapsulate the accessed portion (including the outer header and metadata portion), over and above the already existing first layer of encapsulation.

Once the data packet is re-encapsulated by the above-described double encapsulation (first layer and second layer encapsulation), C2 310 may transmit the double encapsulated data packet to C3 312, in step S8. C3 312 may then perform decapsulation, verification, re-encapsulation (or double encapsulation), in step S9. However, once C3 312 decapsulates the second layer and performs a successful integrity and/or anti-replay check, C3 312 adds another second layer of encapsulation based on the security association between C3 312 and the egress CPE (CPE A2 306). Further, C3 312 transmits the re-encapsulated (or double encapsulated) data packet to CPE-A2 306 based on the label associated with the link between C3 212 and the egress CPE (CPE A2 306), in step S10.

In step S11, CPE-A2 306 may receive the double encapsulated data packet. In step S12, CPE-A2 306 may double decrypt and decapsulate the received double encapsulated data packet. For example, CPE-A2 306 may decapsulate the second layer of encapsulation. In the embodiments where the received double encapsulated data packet includes the second layer of encryption, CPE-A2 306 may additionally decrypt the second layer of encryption based on hop-by-hp security association between CPE-A2 306 and C3 312. Further, CPE-A2 306 may decapsulate the second layer of encapsulation and decrypt the second layer of encryption based on a hop-to-hop security association between C3 212 and CPE-A2 306.

CPE-A2 306 may then, decrypt the first layer of encryption and decapsulate the first layer of encapsulation. In one example, CPE-A2 may decrypt the first layer of encryption and decapsulate the first layer of encapsulation based on an end-to-end security association (e.g., encryption key shared by CPE-A1 304) between CPE-A1 304 and CPE-A2 306.

Once the first and second layers of encryption and encapsulation are respectively decrypted and decapsulated, CPE-A2 306 may then transmit the decrypted and decapsulated data packet to a destination node in the enterprise network CPE-A2, in step S13. Here, CPE-A2 306 may access a destination address field along with the payload portion of the data packet and accordingly, transmit the data packet to the destination node.

In another embodiment, CPE-A2 306 may correspond to the destination node. For instance, the destination node (or CPE-A2 306) may first decapsulate/decrypt the second layer using keys (or security association) shared previously by C3 312 with CPE-A2 306. Further, the destination node (or CPE-A2 306) may decapsulate/decrypt the first layer by using keys that have been previously shared by CPE-A1 304, via the controller 302, for instance.

A person skilled in the art would understand that there can be fewer or larger number of nodes in the core network 314 than the illustrated number of nodes. The number of nodes in FIG. 3 is merely for exemplary purposes. Further, the process performed by the core nodes may be repeated by each core node in the core network 314 to provide a hop-by-hop security by adding the second layer of encapsulation to the data packet. This may be in addition to the end-to-end security that is provided by adding the first layer of encapsulation to the payload portion. Additionally, although the steps of decapsulation and re-encapsulation are described in the context of each core node, a person skilled in the art would understand that these steps may be followed by corresponding steps of decryption and re-encryption, respectively depending on the implementation requirements.

Disclosed embodiments provide many advantages for a secure communication of data packet. For example, $3^{rd}$-party attacks or manipulation may be detected at a hop level in the core network (service provider) and also at the enterprise level (end-to-end). If such manipulation to data packets (customer data) is identified at the hop level, it may be computationally less expensive to determine the source of manipulation. Because each core node performs an integrity check on the double encapsulated data packet as described above, the embodiments of this disclosure facilitate higher security compared to existing solutions where end-to-end integrity check is performed using a single tunnel approach or a double tunnel approach. In a conventional double tunnel mechanism, the entire packet is decapsulated which exposes the customer data in the payload portion which is highly undesirable.

Additionally, each node in the core network 314 may only decapsulate the second encapsulation layer added by the preceding node and perform an integrity check and/or anti-replay check of the accessed portion (e.g., outer header and the metadata portion) of the data packet. Because the nodes of the core network 314 do not decapsulate/view the payload portion of the incoming data packets, the service provider does not have visibility into the actual contents (payload) shared by the customers. This increased level of security reduces the probability of $3^{rd}$-party manipulation of customer data or impersonation. Additionally, because the nodes of the core network do not decapsulate the payload portion of the data packets, the service provider, or the core network 314 do not need key management for end-to-end IP sec tunnels, which is otherwise computationally expensive. However, embodiments presented in the current disclosure may require the service provider to handle key management for the CPE nodes, which may have a substantially less computational complexity as compared to the key management for all the core nodes. Thus, the embodiments of the current disclosure result in computationally efficient and secure infrastructure and method for communication between enterprise networks.

Figure 4:
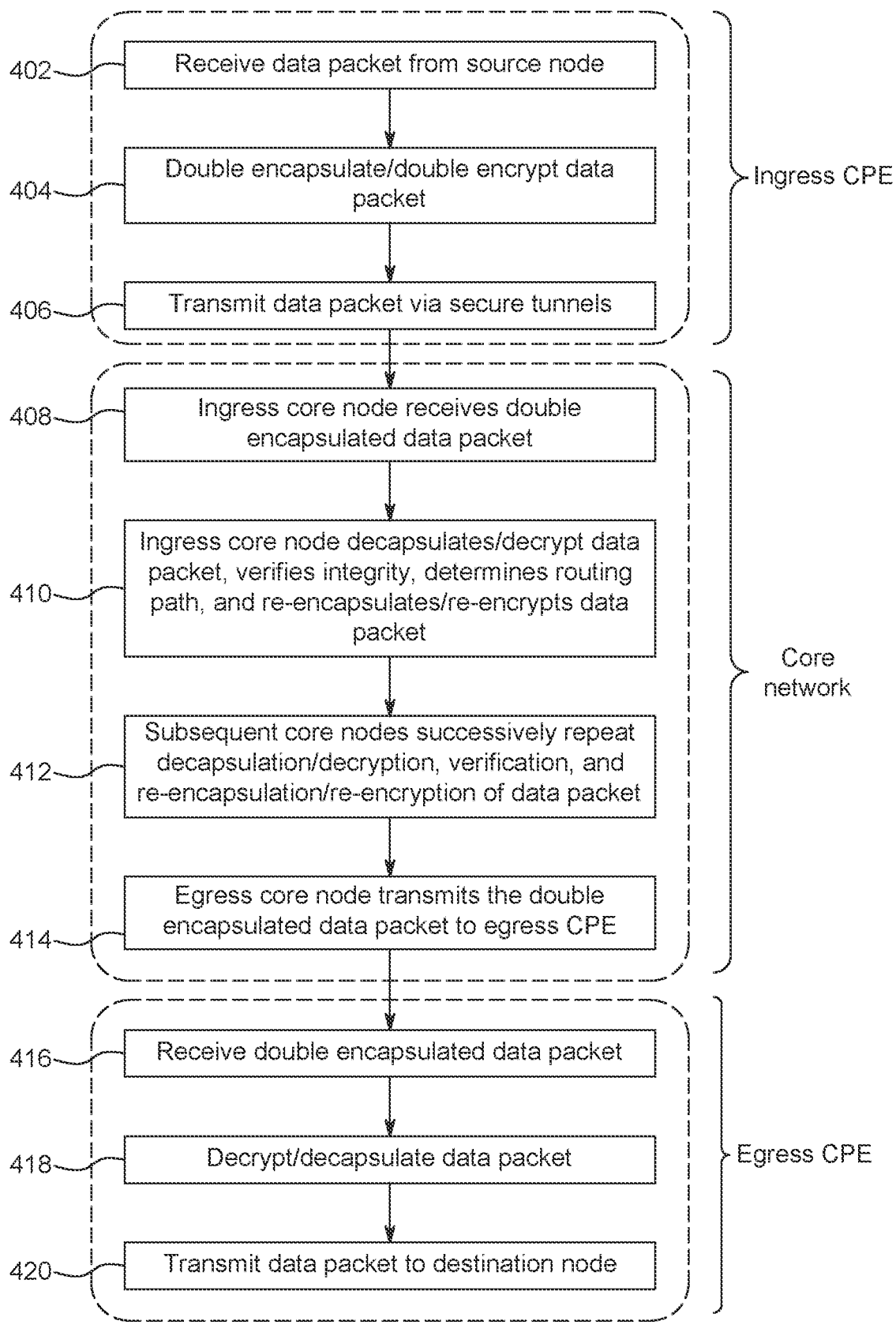
FIG. 4 is a flowchart illustrating the steps involved in secure communication between enterprise nodes of enterprise networks, according to an embodiment.

FIG. 4 is a flowchart illustrating the steps involved in secure communication between enterprise nodes of enterprise networks, in accordance with the embodiments of this disclosure. In one example, these steps may be implemented in a communication network, such as the network architecture 200 illustrated in FIG. 2. As illustrated in FIG. 4, steps 402 to 406 may be performed by the ingress CPE such as CPE-A1 204. Further, steps 408 to 414 may be performed in a core network corresponding to the core network 214 of FIG. 2. Further, steps 416 to 420 may be performed by an egress CPE, which may correspond to CPE-A2 206 of FIG. 2. Each step in FIG. 4 may be executed in a manner similar to the steps discussed in FIG. 3 and therefore, may not be described extensively again for brevity.

Referring to FIG. 4, in step 402, the ingress CPE (CPE-A1 204) may receive a data packet from a source node. In step 404, the ingress CPE may double encapsulate data packet, in the manner described earlier. In an embodiment, the double encapsulated data packet may also be double encrypted but may still be referred to as 'double encapsulated' for the purposes of explanation. Once the data packet is double encapsulated, the ingress CPE may transmit the double encapsulated data packet, in step 406, to the ingress core node via secure hop-to-hop and end-to-end tunnels, as described earlier.

In step 408, the ingress core node (e.g., C1 208) may receive the double encapsulated data packet transmitted by the ingress CPE. In step 410, C1 208 may decapsulate the second layer of encapsulation, perform an integrity check and/or anti-replay check on the data packet, and re-encapsulate the data packet. In an embodiment, C1 208 may also decrypt and re-encrypt the second layer of encryption in the data packet. In step 412, one or more other core nodes (e.g., C2 310) may successively receive the double encapsulated data packet from their preceding core nodes (e.g., C1 308) and re-encapsulate the data packet in the manner earlier discussed in the context of FIG. 3. Thus, each subsequent core node may repeat the process of decapsulation, verification (integrity check and anti-replay check), and re-encapsulation of the data packet till the data packet reaches the egress core node. Each such core node may also decrypt and re-encrypt the second layer of encryption, as discussed earlier. Further, the egress core node (e.g., C3 212) may then transmit the double encapsulated data packet to the egress CPE (CPE-A2 206), in step 414.

In step 416, the egress CPE may receive the double encapsulated data packet and decapsulate both the first and second layers of encapsulation, in the manner described in the relation to FIG. 3. In step 418, the egress CPE may also decrypt/decapsulate both the first and second layer of encryption in the received double encapsulated data packet. In step 420, the egress CPE may transmit the decapsulated and decrypted data packet to the destination node.

In accordance with the embodiments presented herein, the core nodes and/or ingress/egress CPEs may include at least a processor and a memory storage that may store one or more computer-executable instructions. The computer-executable instructions, when executed by the processor, may cause the processor to perform the steps as described with reference to FIGS. 3 and 4.

Figure 5:
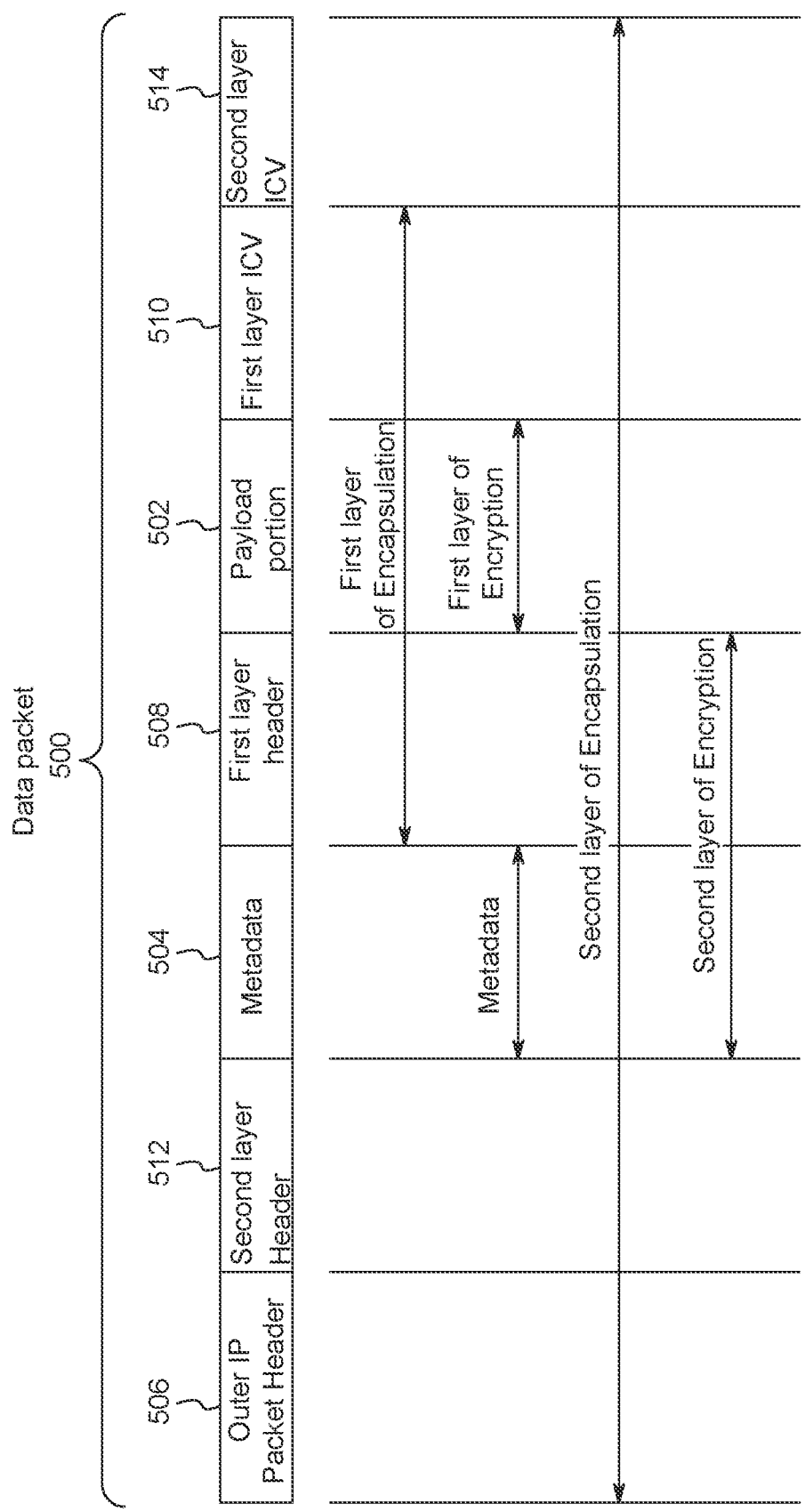
FIG. 5 illustrates an example format of a double encapsulated/encrypted data packet, according to an embodiment.

FIG. 5 illustrates an example format of a double encapsulated data packet 500, in accordance with the embodiments of this disclosure. The data packet 500 may include a payload portion 502, a metadata portion 504 and an outer header 506 (e.g., an outer IP header). The payload portion 502 may include customer data that may be sensitive and/or confidential. The metadata portion 504 may include metadata associated with the data packet. Here, the first layer of encapsulation may encapsulate the payload portion 502. In an embodiment, the first layer of encapsulation is an end-to-end encapsulation and may result in appending an end-to-end first layer header 508 and an end-to-end first layer ICV 510 to the payload portion of the data packet 500.

Further, the first layer of encryption may be an end-to-end encryption that encrypts the encapsulated payload portion 502, in one example. In another example, the first layer of encryption may also encrypt the first layer trailer in addition to the encapsulated payload portion.

The second layer of encapsulation may be a hop-by-hop encapsulation and encapsulates the entire data packet 500. Therefore, the second layer of encapsulation encapsulates the portion of the data packet 500 that was not encapsulated by the first layer of encapsulation (e.g., outer header 506 and metadata portion 504). The second layer also provides an additional layer of encapsulation to the already encapsulated and encrypted payload portion 502. The double encapsulated data packet may also include a second layer header 512 and a first layer ICV 514, which are known in the art.

Further, the second layer of encryption may be a hop-by-hop encryption that encrypts the second layer-encapsulated metadata portion 504 (partially or completely) along with the second layer-encapsulated first layer header 508.

Thus, the embodiments of this disclosure enhance the security of the communication between enterprise networks, as explained above.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition, or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the networks, devices, and/or modules described herein contain optional features that can be individually or together applied to any other embodiment shown or contemplated here to be mixed and matched with the features of such networks, devices, and/or modules.

While the invention has been described with respect to a limited number of embodiments, those skilled in the art, having benefit of this disclosure, will appreciate that other embodiments can be devised which do not depart from the scope of the invention as disclosed herein.

We claim:

1. A core node in a core network for secure network communication, the core node comprising:
   a processor; and
   a memory storing computer-executable instructions that when executed, cause the processor to:
      receive a double encapsulated data packet associated with a first layer of encapsulation and a second layer of encapsulation;
      decapsulate the second layer of encapsulation to access a portion of the data packet;
      re-encapsulate at least the accessed portion of the data packet with another second layer of encapsulation; and
      transmit the re-encapsulated data packet to a subsequent node based on the accessed portion.

2. The core node of claim 1, wherein the first layer of encapsulation corresponds to an end-to-end encapsulation and the second layer of encapsulation corresponds to a hop-by-hop encapsulation.

3. The core node of claim 1, wherein the second layer of encapsulation is based on a first security association between the core node and another node, from which the core node receives the double encapsulated data packet.

4. The core node of claim 3, wherein the another second layer of encapsulation is based on a second security association between the core node and the subsequent node.

5. The core node of claim 1, wherein the received data packet is associated with a first layer of encryption and a second layer of encryption.

6. The core node of claim 5, wherein the computer-executable instructions further cause the processor to:
   decrypt the second layer of encryption of the received data packet; and
   re-encrypt the re-encapsulated data packet with another second layer of encryption.

7. The core node of claim 1, wherein the first layer of encapsulation encapsulates a payload portion of the received data packet and further wherein, the second layer of encapsulation encapsulates the encapsulated payload portion, a metadata portion, and one or more headers of the received data packet.

8. The core node of claim 1, wherein the accessed portion of the data packet comprises one or more headers of the data packet.

9. The core node of claim 8, wherein the one or more headers of the data packet comprise one or more of an IPv4 header and/or an IPv6 header.

10. The core node of claim 1, wherein the computer-executable instructions further cause the processor to:
    perform one or more of an integrity check and an anti-replay check on the accessed portion of the data packet to verify one or more contents of the accessed portion;
    re-encapsulate at least the accessed portion based on a positive verification of the one or more of the integrity check and the anti-replay check; and
    discarding the data packet based on a negative verification of the one or more of the integrity check and the anti-replay check.

11. The core node of claim 1, wherein the computer-executable instructions further cause the processor to transmit the re-encapsulated data packet to the subsequent node via a secure Internet Protocol Security (IPsec) tunnel.

12. A method in a core node for routing data packets for secure network communication, the method comprising:
    receiving a double encapsulated data packet associated with a first layer of encapsulation and a second layer of encapsulation;
    decapsulating the second layer of encapsulation to access a portion of the data packet;

re-encapsulating at least the accessed portion with another second layer of encapsulation; and transmitting the re-encapsulated data packet to a subsequent node based on the accessed portion.

13. A customer premises equipment (CPE) in an enterprise network for secure network communication, the CPE comprising:

a processor; and a memory storing computer-executable instructions that when executed, cause the processor to:

transmit a double encapsulated data packet to another CPE, via one or more core nodes, wherein the data packet is associated with a first layer of encapsulation and a second layer of encapsulation, and further wherein, the transmitted double encapsulated data packet is processed by one or more core nodes to decapsulate the second layer of encapsulation to access a portion of the data packet and re-encapsulate the accessed portion with another second layer of encapsulation prior to transmitting the re-encapsulated data packet.

14. The CPE of claim 13, wherein computer-executable instructions further cause the processor to:

receive a data packet from a source node in the enterprise network;

impose double encapsulation on the received data packet to create the double encapsulated data packet; and transmit the double encapsulated data packet to one of the one or more core nodes.

15. The CPE of claim 14, wherein computer-executable instructions further cause the processor to:

impose a first layer of encapsulation on the received data packet to create a single encapsulated data packet; and impose the second layer of encapsulation on the single encapsulated data packet to create the double encapsulated data packet.

16. The CPE of claim 13, wherein computer-executable instructions further cause the processor to impose a first layer of encryption on the single encapsulated data packet based on end-to-end security association between the CPEs, and a second layer of encryption on the double encapsulated data packet based on security association between the hop-by-hop nodes, wherein the first layer of encryption is decryptable by another CPE based on a security association between the CPE and the another CPE.

17. The CPE of claim 15, wherein the first layer of encapsulation encapsulates a payload portion of a received data packet to create a single encapsulated data packet and further wherein, the second layer of encapsulation encapsulates the encapsulated payload portion, a metadata portion, and one or more headers of the single encapsulated data packet to create the double encapsulated data packet.

18. The CPE of claim 13, wherein the second layer of encapsulation is based on a first security association between the CPE and one of the one or more core nodes.

19. The CPE of claim 18, wherein the another second layer of encapsulation is based on a second security association between the one of the one or more core nodes and a subsequent node.

20. The CPE of claim 13, wherein the computer-executable instructions further cause the processor to transmit the double encapsulated data packet to the another CPE via a secure Internet Protocol Security (IPsec) tunnel.

* * * * *